(12) United States Patent
Feng et al.

(10) Patent No.: US 10,381,899 B2
(45) Date of Patent: Aug. 13, 2019

(54) SIDEWALL CORING STRUCTURE DIRECTLY DRIVEN BY AN ELECTRIC MOTOR

(71) Applicants: China National Offshore Oil Corporation, Beijing (CN); China Oilfield Services Limited, Sanhe, Hebei (CN)

(72) Inventors: Yongren Feng, Beijing (CN); Jibin Zou, Heilongjiang (CN); Jian Li, Beijing (CN)

(73) Assignees: CHINA NATIONAL OFFSHORE OIL CORPORATION, Beijing (CN); CHINA OILFIELD SERVICES LIMITED, Sanhe, Hebei (CN)

( * ) Notice: Subject to any disclaimer, the term of this patent is extended or adjusted under 35 U.S.C. 154(b) by 120 days.

(21) Appl. No.: 15/193,425

(22) Filed: Jun. 27, 2016

(65) Prior Publication Data

US 2017/0214291 A1 Jul. 27, 2017

(30) Foreign Application Priority Data

Jan. 21, 2016 (CN) .......................... 2016 1 0041543

(51) Int. Cl.
*E21B 7/04* (2006.01)
*E21B 49/06* (2006.01)
*H02K 7/116* (2006.01)

(52) U.S. Cl.
CPC .............. *H02K 7/116* (2013.01); *E21B 49/06* (2013.01)

(58) Field of Classification Search
CPC ........... H02K 7/16; E21B 4/006; E21B 7/046; E21B 7/061; E21B 7/062; E21B 49/06
See application file for complete search history.

(56) References Cited

U.S. PATENT DOCUMENTS 5,411,106 A * 5/1995 Maissa .................... E21B 49/06
175/250
5,439,065 A 8/1995 Georgi
(Continued)

FOREIGN PATENT DOCUMENTS

CN 101253309 A 8/2008
CN 101498200 A 8/2009
(Continued)

OTHER PUBLICATIONS

Zhang, Lihua et al., "Handbook of Machine Design—New Edition", Dated May 31, 2008, Source—The People's Post and Telecommunications Press, p. 731, ISBN 978-7-115-17431-4 4 Pages.
(Continued)

*Primary Examiner* — Cathleen R Hutchins
(74) *Attorney, Agent, or Firm* — Brooks Kushman P.C.

(57) ABSTRACT

The present application provides a sidewall coring structure directly driven by an electric motor comprising a drill bit, an electric motor and a speed reducer, the electric motor and the speed reducer are an integrated structure and the drill bit is directly connected to an output of the speed reducer. The coring structure directly drives the drill bit through an integrated structure of the speed reducer and the electric motor; its transmission efficiency is greatly improved, meanwhile the coring structure is more simplified, with improved reliability, easier maintenance and reduced maintenance cost.

15 Claims, 5 Drawing Sheets

(56) References Cited

U.S. PATENT DOCUMENTS

| | | | |
|---|---|---|---|
| 10,018,038 B2 | 7/2018 | Feng et al. | |
| 2007/0045005 A1* | 3/2007 | Tchakarov | E21B 49/06 175/20 |
| 2013/0068531 A1 | 3/2013 | Joulin et al. | |

FOREIGN PATENT DOCUMENTS

| | | |
|---|---|---|
| CN | 201336499 Y | 10/2009 |
| CN | 102134964 A | 7/2011 |
| CN | 203452780 U | 2/2014 |
| CN | 203756037 U | 8/2014 |
| CN | 104153772 A | 11/2014 |

OTHER PUBLICATIONS

Chinese First Office Action dated Sep. 25, 2017, Application No. 201610041543.7, (With English Translation), 21 Pages.
Chinese Second Office Action dated Jun. 26, 2018, Application No. 201610041543.7, (With English Translation), 15 Pages.
Chinese Third Office Action dated Jan. 8, 2019, Application No. 201610041543.7, (With English Translation), 19 Pages.

* cited by examiner

SIDEWALL CORING STRUCTURE DIRECTLY DRIVEN BY AN ELECTRIC MOTOR

CROSS-REFERENCE TO RELATED APPLICATIONS

This application claims foreign priority benefits under 35 U.S.C. § 119(a)-(d) to Chinese patent application number CN 201610041543.7, filed Jan. 21, 2016, which is incorporated by reference in its entirety.

TECHNICAL FIELD

The present application belongs to the technical field of the petroleum exploration, and more particularly, to a coring structure in the technical field of the petroleum exploration.

BACKGROUND

In existing coring device, the electric motor and the speed reducer are two separate elements, and the drill bit is connected with the speed reducer through a flexible shaft. This structure has lower transmission efficiency, and the flexible shaft is easy to break and bend, the maintenance rate of the instrument is higher.

The stretching of the drill bit of the existing coring device is achieved by four hydraulic cylinders jacking the frame, the rotating and swinging of the drill bit are achieved by other hydraulic cylinder and control mechanism, its structure is complex and multiple power sources are needed.

SUMMARY

One object of the present disclosure is to provide a sidewall coring structure that has higher transmission efficiency and improved the drill bit propulsion.

To achieve the above object of the disclosure, the present application provides the following technical solution.

A sidewall coring structure configured to be directly driven by an electric motor, comprising a drill bit, an electric motor and a speed reducer, wherein the electric motor and the speed reducer are an integrated structure and the drill bit is directly connected to an output of the speed reducer.

Alternatively, the housings of the electric motor and the speed reducer are separable, both of which are sealedly and fixedly connected and an output shaft of the electric motor is as a fixed shaft of an input gear of the speed reducer.

Alternatively, an output port of the electric motor has a wire protection device that can rotate with the rotation of the drill bit.

Alternatively, the wire protection device is turnably and sealedly connected to the electric motor, and a wire of the electric motor is fixed by the wire protection device and rotates therewith.

Alternatively, the wire protection device comprises two parts: a main structure and an auxiliary structure, and a wire groove for fixing the wire of the electric motor is formed within the main structure.

The above technical solution has the following beneficial technical effects compared to prior art.

The transmission efficiency of a coring mechanism which is directly driven by the speed reducer is greatly improved; meanwhile, the coring structure is more simplified with improved reliability, easier maintenance and reduced maintenance cost.

Compared to the separated structure of the electric motor and speed reducer in existing coring structure, it is better adapted to the work environment of the high temperature and pressure of the coring structure, and the integrated electric motor and speed reducer makes the volume of the drive device of drill bit smaller and is conductive to the miniaturization of the coring device.

The configuration of an electric motor wire follower device provides safeguard for the drill bit directly driven by the speed reducer and the electric motor, and also ensures a normal operation of the electric motor during stretching and turning motions of the drill bit.

Another object of the present disclosure is to provide a sidewall coring structure that has higher transmission efficiency and the motion control mechanism of the drill bit is more simple and effective.

In order to achieve above object of the disclosure, the present application provides the following technical solution.

A sidewall coring structure directly driven by an electric motor comprising a drill bit, a drive device of drill bit and a frame, the drill bit is connected to an output of the drive device of drill bit, wherein further comprises a motion control mechanism of drill bit, the motion control mechanism of drill bit is accommodated within the frame and the drive device of drill bit is accommodated within the motion control mechanism of drill bit, the motion control mechanism of drill bit drives the drill bit to achieve the stretching and turning motions.

Alternatively, the motion control mechanism of drill bit comprises an auxiliary bracket, a group of parallel sliding plates and hydraulic oil cylinders, both the auxiliary bracket and the drive device of drill bit are accommodated in a space formed after the fixation of the sliding plates, the auxiliary bracket and the drive device of drill bit are movably connected, the sliding plates horizontally slide along an axial direction of the coring structure under the pushing from the hydraulic oil cylinders and drive the drive device of drill bit to stretch and turn.

Alternatively, the auxiliary bracket and the drive device of drill bit are slidably connected by a connecting plate, and the auxiliary bracket limits the horizontal motion of the drive device of drill bit along the axial direction of the coring structure as well as the clockwise turning motion with respect to the auxiliary bracket.

Alternatively, the connecting plate is slidably connected to the sliding plate and is turnably connected to the drive device of drill bit.

Alternatively, a first sliding shaft and a rotating shaft hole are provided on the connecting plate, and a second sliding shaft and a rotating shaft are provided on the drive device of drill bit; a first inclined chute and a second inclined chute are formed on the sliding plate, the first sliding shaft is sleeved within the first inclined chute, and the second sliding shaft is sleeved within the second inclined chute; and the rotating shaft is sleeved within the rotating shaft hole.

Alternatively, a horizontal chute is provided at an end of the first inclined chute, the first inclined chute is in continuous communication with the horizontal chute; and an arc chute is provided within the second inclined chute, and the second inclined chute is in continuous communication with the arc chute.

Alternatively, a limit groove is provided at an end of the connecting plate, in the meantime, the second sliding shaft is sleeved within the limit groove, and the limit groove limits a clockwise rotation of the drive device of drill bit driven by the second sliding shaft.

Alternatively, the auxiliary bracket has a turning groove that accommodates the drive device of drill bit driving the drill bit to turn 90 degrees counterclockwise.

Preferably, there are two hydraulic oil cylinders.

Alternatively, the drive device of drill bit is an integrated structure that includes the electric motor and the speed reducer, and the drill bit is connected to the output of the speed reducer.

Alternatively, the housings of the electric motor and the speed reducer are separable, both of which are sealedly and fixedly connected and an output shaft of the electric motor is as a fixed shaft of an input gear of the speed reducer.

Alternatively, the second sliding shaft and the rotating shaft are formed in the housing of the speed reducer and the rotating shaft is located at a center of the housing of the speed reducer; the second sliding shaft is eccentrically provided with respect to the rotating shaft.

Alternatively, the output port of the electric motor has a wire protection device that can rotate with the rotation of drill bit.

The above technical solution brings the following beneficial technical effects compared to the prior art.

The stretching and turning motions of the drill bit of this application can be achieved by a kit of drill bit control mechanism, the control mechanism of the coring structure is more simplified and more directly and effectively to control the motions of the drill bit with respect to the existing two kit of mechanisms for respectively achieving stretching and turning.

The stretching and turning control and the pushing force control of the drill bit in the coring structure of the present application can be fully achieved by only two hydraulic oil cylinders; with respect to a plurality of hydraulic oil cylinders required in the prior art, the present application has a simpler structure and a higher utilization rate of power.

REFERENCE SIGNS

1—an electric motor; 101—a rotor shaft of electric motor; 102—a housing;
2—a speed reducer; 201—an input gear; 202—an output shaft; 203—a housing; 204—a chute;
3—a drill bit; 4—a rotating shaft; 5—a second sliding shaft;
6—a wire follower protection device; 601—a main structure; 602—a wire groove; 603—a seal ring; 604—an auxiliary component;
7—wire; 8—screw;
9—a sliding plate; 901—a first inclined chute; 902—an arc chute; 903—a horizontal chute; 904—a slider; 905—a second inclined chute;
10—a hydraulic cylinder piston; 11—a long fixed block; 1101—a horizontal chute;
12—an auxiliary bracket; 1201—a vertical chute; 1202—a limit face; 1203—a turning groove; 1204—a connection groove;
13—a body; 14—a short fixed block;
15—a connecting plate; 1501—a sliding block; 1502—a limit groove; 1503—a first sliding shaft; and
16—a connecting block.

DETAILED DESCRIPTION

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In order to make the disclosure objects, technical solutions and beneficial effects of the disclosure clearer, the embodiments of the present disclosure will be described in detail below in conjunction with accompanying drawings. It should be noted that the embodiments in the present application and the features in the embodiments can be combined with each other randomly without conflict.

Figure 1:
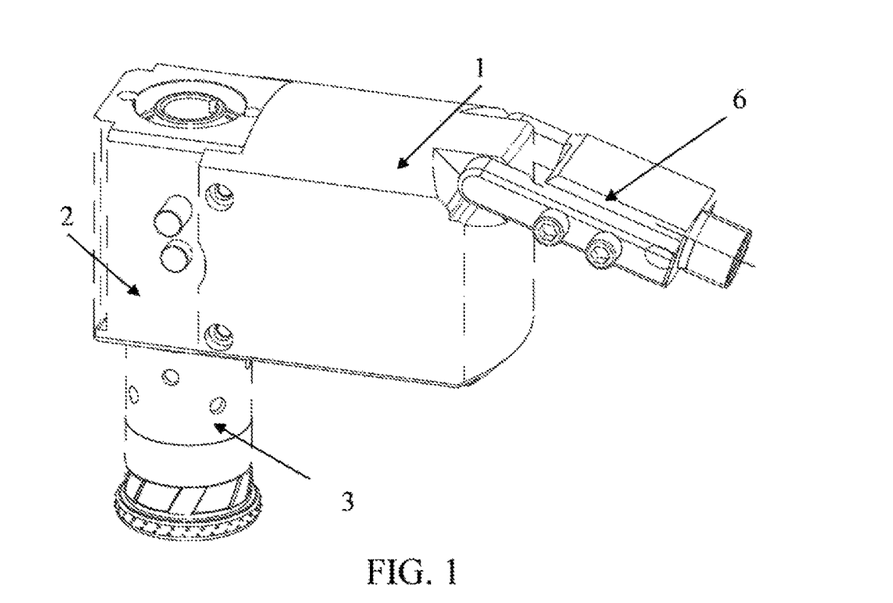
FIG. 1 is a perspective view of the integrated structure of the drill bit, the speed reducer and the electric motor.
Figure 2:
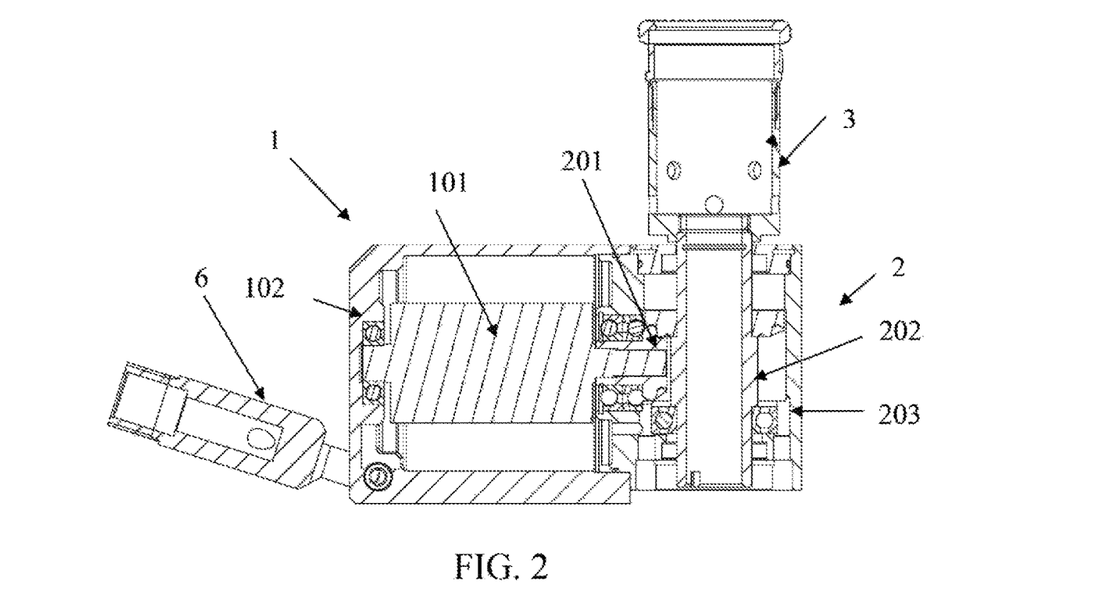
FIG. 2 is a sectional view of the integrated structure of the drill bit, the speed reducer and the electric motor.
Figure 3:
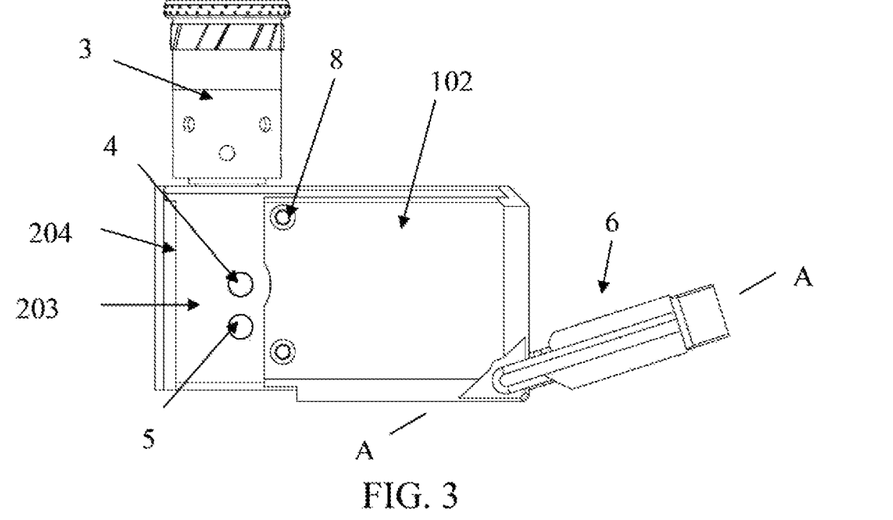
FIG. 3 is a front view of the integrated structure of the drill bit, the speed reducer and the electric motor.

FIG. 1, FIG. 2 and FIG. 3 show a perspective view, a sectional view and a front view of the integrated structure portion of a drill bit, a speed reducer and an electric motor of the sidewall coring structure directly driven by an electric motor in the embodiment. FIG. 1 shows the connection relations of an electric motor 1, a speed reducer 2, a drill bit 3 and an electric motor wire follower protection device 6 (i.e., a wire protection device), wherein the electric motor 1 and the speed reducer 2 are an integrated structure, the drill bit 3 is directly connected to the speed reducer 2, the electric motor wire follower protection device is rotatably connected to a tail of the electric motor 1.

FIGS. 2 and 3 show the connection relations of the interiors and the housings of the electric motor 1, the speed reducer 2 and the drill bit 3, a housing 102 of the electric motor 1 and a housing 203 of the speed reducer 2 are separable, and both are fixed by screws 8; preferably, both are sealedly and fixedly connected. The drill bit 3 is directly connected to an output shaft 202 of the speed reducer 2 and a rotor shaft 101 of the electric motor is as a fixed shaft of an input gear 201 of the speed reducer 2. This structure simplifies the connection between the drill bit 3 and the speed reducer 2 (the connection is simplified from the previous connection by a flexible shaft to a direct connection), and improves the power transmission efficiency from the original 35% to 80%.

FIG. 3 shows a housing structure of the speed reducer 2, and a rotating shaft 4 and a second slide shaft 5 are symmetrically provided on both sides of the housing of the speed reducer 2; wherein the rotating shaft 4 is located at a center position of a side of the housing of the speed reducer 2 and the second sliding shaft 5 is eccentrically provided relative to the rotating shaft 4. FIG. 3 also shows a chute 204 provided on a prism portion on each of both sides of a front end of the speed reducer 2 for matching a position of a prism on an end face of the auxiliary bracket.

Figure 4:
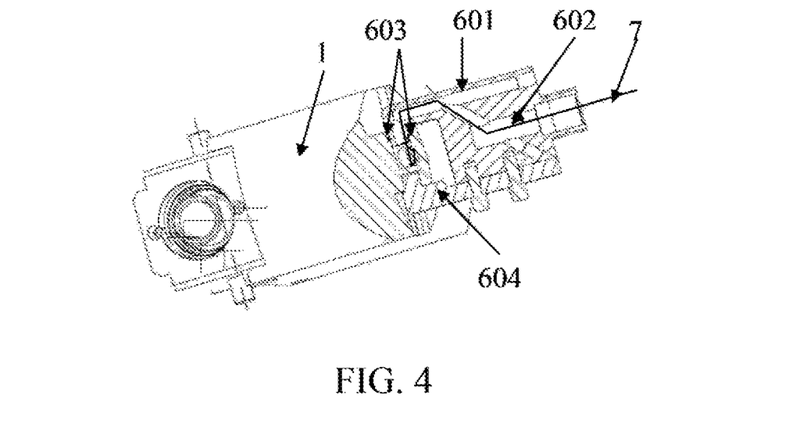
FIG. 4 is a sectional view along A-A in FIG. 3.

Referring to FIG. 3 and FIG. 4, FIG. 4 shows a connection relation between the electric motor wire follower protection device 6 and the electric motor 1 and an internal structure of the follower protection device. A shaft hole is provided at a tail of the electric motor 1 and a rotating shaft is provided at an end of the electric motor wire follower protection device 6, both of which form a rotatable connection relation. The electric motor wire follower protection device 6 consists of a main structure 601 and an auxiliary component 604, when assembled, the main structure 601 is sleeved in the shaft hole of the tail of the electric motor 1, followed by fitting an auxiliary component 604, both of which are secured to an integral whole by screws, and the main structure 601 is sealedly connected to the housing of the electric motor 1 by seal rings 603. The main structure 601 includes a rotating shaft portion and a main body portion, wherein the rotating shaft portion is hollow and the main body portion has a wire groove 602 for fixing the wire 7 of the electric motor; a tail of the main body portion has a hole for leading wire to extend out.

Figure 5:
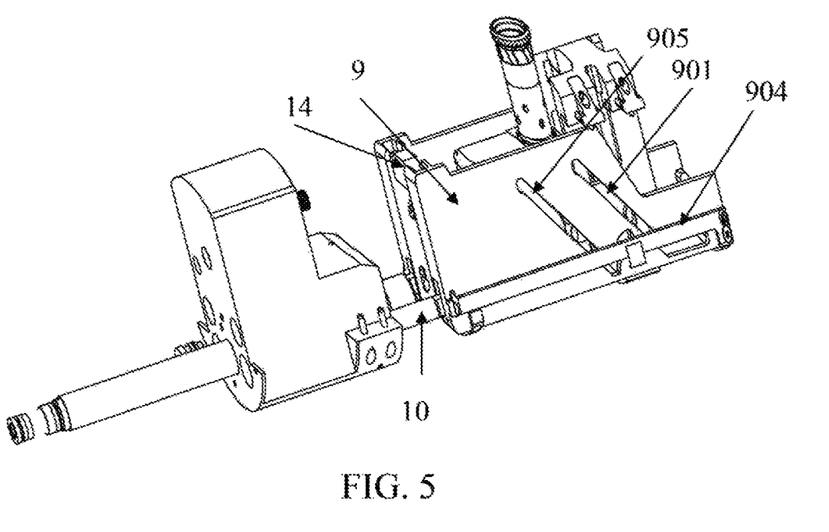
FIG. 5 is a schematic diagram of the drilling process by the drill bit with the body removed.
Figure 6:
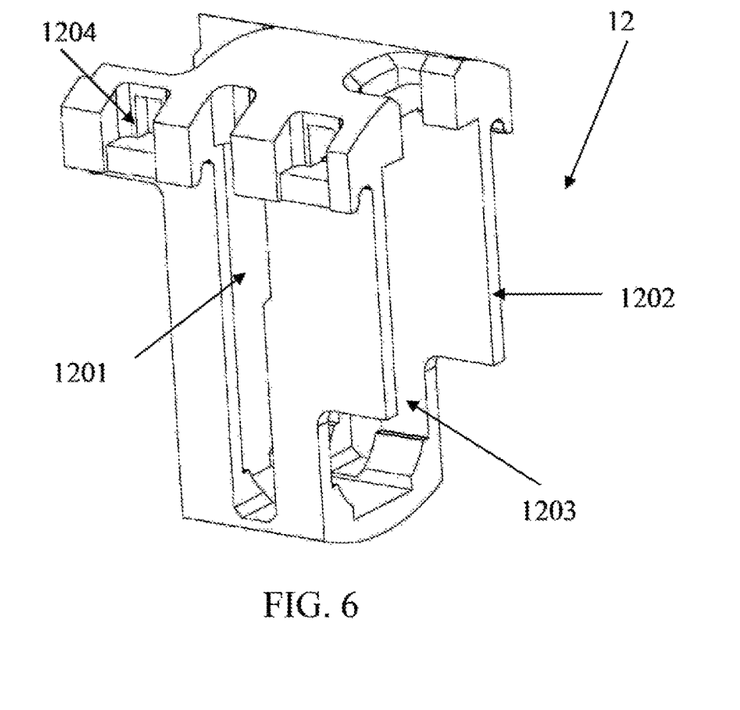
FIG. 6 is a structure schematic diagram of the auxiliary bracket.
Figure 7:
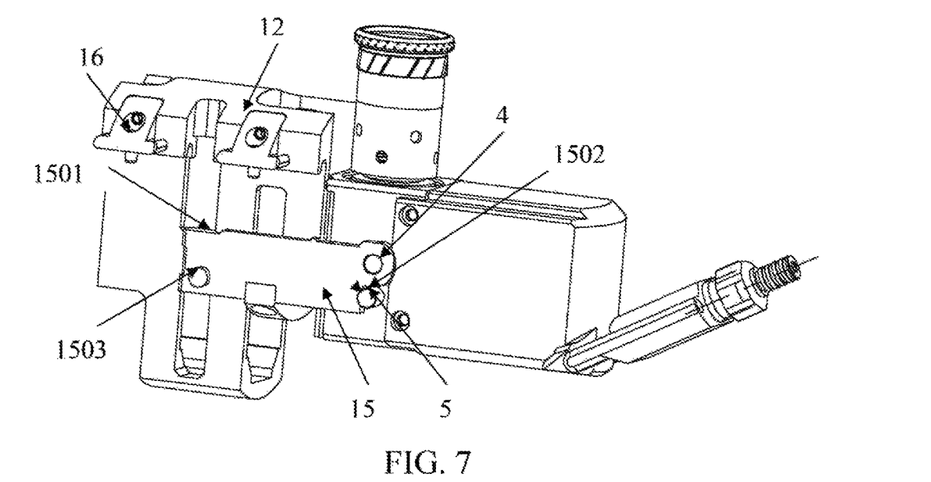
FIG. 7 is a schematic diagram of the connection of the speed reducer and the auxiliary bracket after removing the body, the sliding plates and the connecting plate.
Figure 8:
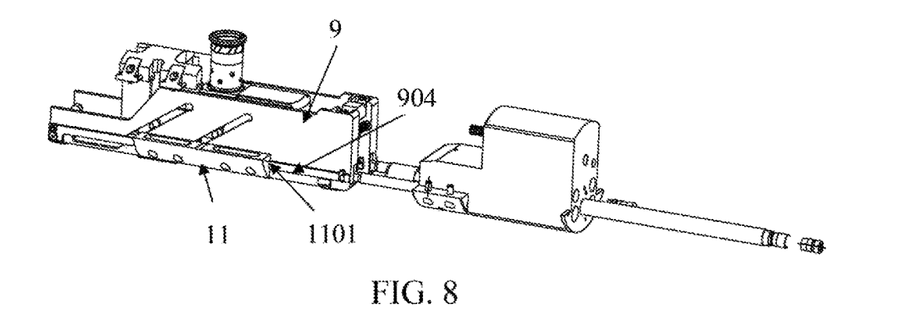
FIG. 8 is a schematic diagram of the connection of the sliding plate and a long fixed block.
Figure 9:
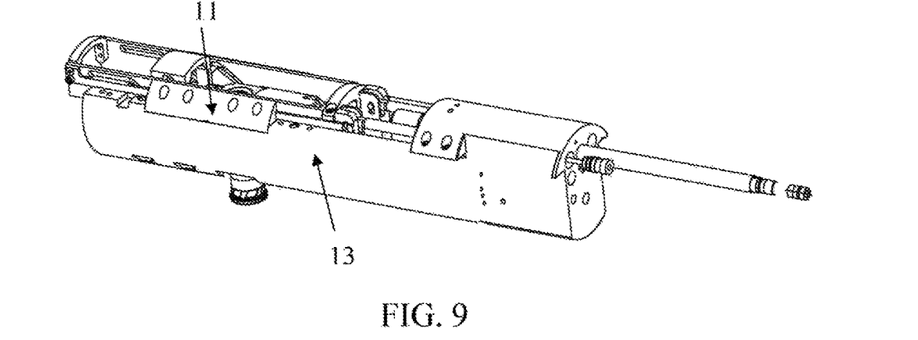
FIG. 9 is a structure schematic diagram after installing the body.

Referring to FIGS. 5 to 9, wherein FIG. 5 is a schematic diagram of the drilling process of the drill bit with the body removed; FIG. 6 is a structure schematic diagram of an auxiliary bracket; FIG. 7 is a schematic diagram of the connection of the speed reducer and the auxiliary bracket after removing the body, the sliding plates and the connecting plate; FIG. 8 is a schematic diagram of the connection of the sliding plate and the long fixed block; FIG. 9 is a structure schematic diagram after installing the body; FIG. 5 shows a pair of sliding plates 9 in parallel, but it is not limited to provide a pair of sliding plates 9, and multiple pairs may be provided as required. An end of each sliding plate 9 is fixedly connected to a hydraulic cylinder piston 10, wherein a front end, a middle and a rear end of the sliding plate 9 are fixed to be a space with opening top and bottoms through the short fixed blocks (FIG. 5 merely marks the short fixed block 14 at the front end, the short fixed blocks at the middle and the rear end are not showed in the figure because of being blocked); the electric motor 1, the speed reducer 2 and the drill bit 3 are connected to an integrated structure accommodated within the space. A first inclined chute 901 and a second inclined chute 905 and a slider 904 that is matched with a long fixed block 11 are provided at an outside of the sliding plate 9 (see FIG. 8), the slider 904 is matched with a chute on the long fixed block 11 and the long fixed block 11 is fixedly connected with a body 13 (see FIG. 9); under the action of the hydraulic cylinder piston 10, the slide plate 9 horizontally moves along the long fixed block 11. Meanwhile, the second sliding shaft 5 of the speed reducer 2 moves along the second inclined chute 905, drives the integrated structure connected by the electric motor 1, the speed reducer 2 and the drill bit 3 to perform vertical movement, to achieve stretching of the drill bit 3; a bottom of the second inclined chute 905 that is matched with the second sliding shaft 5 has an arc chute 902, and a bottom of the first inclined chute 901 that is matched with a first sliding shaft 1503 exterior to the connecting plate has a horizontal chute 903 (see FIG. 11).

Referring to FIG. 6 and FIG. 7, wherein FIG. 6 is a perspective view of an auxiliary bracket 12, FIG. 7 is a schematic diagram of the connection of the speed reducer and the auxiliary bracket after removing the body, the sliding plates and the connecting plate; FIG. 6 shows that the auxiliary bracket 12 is an integrally molded hollow profiled cuboid, a through (not interrupted) vertical chute 1201 is provided on one side thereof, the tops of both the side provided with the vertical chute 1201 and its opposite side are provided with a connection groove 1204 for receiving a connecting block 16 connected to the body, the connecting block 16 and the auxiliary bracket 12 are connected by screws. A top of a surface adjacent to the vertical chute 1201 is a vertical face which is as a limit face 1202 of stretching movement of the drill bit 3 and at the same time this face limits the drill bit 3 horizontally sliding. A turning groove 1203 is formed because of the internal reduction in the bottom of the vertical face for holding the turned drill bit (see FIG. 10). FIG. 7 shows that a connecting plate 15 is connected with the auxiliary bracket 12 and the speed reducer 2; the connecting plate 15 is a rectangular flat plate, one end thereof (at a side connecting with the auxiliary bracket 12) is provided with a sliding block 1501, the sliding block 1501 is matching with the vertical chute 1201 of the auxiliary bracket 12, and an outer side corresponding to the position of the sliding block 1501 has a first sliding shaft 1503, the other end of the connecting plate 15 projects outwardly to form a projecting portion, a shaft hole is provided on the projecting portion to cooperate with a rotating shaft 4 of the speed reducer 2, a limit groove 1502 is formed between the projecting portion and the connecting plate body for restricting the clockwise rotation of the integrated structure of the drill bit, the speed reducer and the electric motor, the second sliding shaft 5 of the speed reducer 2 is located within the limit groove 1502. In addition, because the bottom of the vertical chute 1201 of the auxiliary bracket 12 is stepwise graduated within the chute, when the sliding block 1501 of the connecting plate 15 slid to the bottom of the vertical chute 1201, a self-locking can form.

Figure 10:
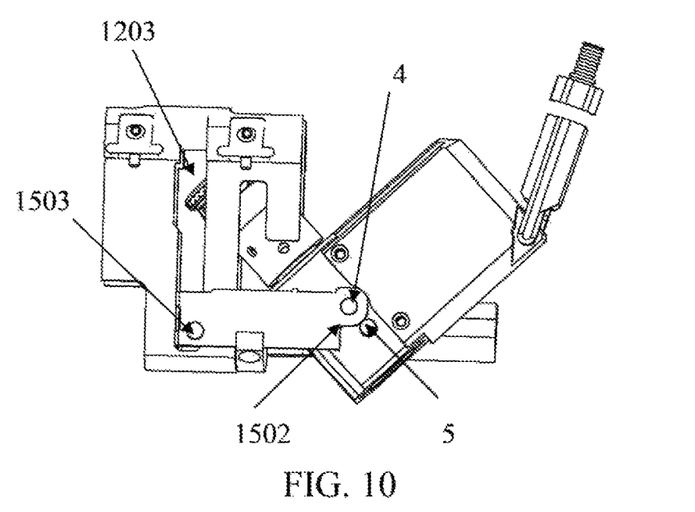
FIG. 10 is a schematic diagram of the drill bit turning with the sliding plates removed.
Figure 11:
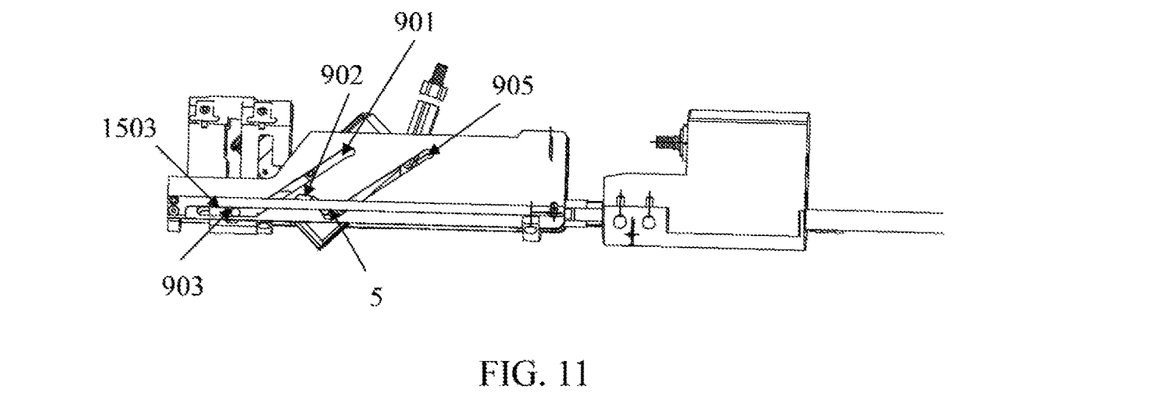
FIG. 11 is a schematic diagram of the drill bit turning without the sliding plates removed.

Referring to FIG. 10 and FIG. 11, FIG. 10 and FIG. 11 show a relative positional relation between the various members during turning of the drill bit of the coring structure. When the drilling operation is completed, the drill bit is retracted to the body; at this time, the second sliding shaft 5 of the speed reducer 2 and the first sliding shaft 1503 of the outside of the connecting plate simultaneously respectively reach the bottom of the second inclined chute 905 and the bottom of the first inclined chute 901; under continuous pressure, while the second sliding shaft 5 moves along the arc chute 902, the integrated structure of the electric motor 1, the speed reducer 2 and the drill bit 3 rotates around the rotating shaft 4 counterclockwise, the second sliding shaft 5 roll out from the limit groove 1502; when the drill bit turns 90 degrees, the drill bit 3 fully enters into the turning groove 1203 of the auxiliary bracket 12. The first sliding shaft 1503 moves along the horizontal chute 903 while the second sliding shaft 5 moves.

In specific application, on the basis of the above-mentioned technical solutions, the drilling depth of the drill bit can be determined by providing one or more sensors on the hydraulic cylinder piston and by testing the movement distance of the hydraulic cylinder piston.

In specific application, the electric motor may adopt a brushless DC motor; and the speed reducer may adopt a reducer driven by helical gears.

The sidewall coring structure directly driven by an electric motor of the present embodiments improves power mechanism of the drill bit from the existing connection of the electric motor and the speed reducer and the drill bit being connected with the speed reducer through the flexible shaft to transmit power to an integrated structure of the electric motor and the speed reducer to drive the drill bit directly; the stretching and turning of the drill bit are achieved by providing the auxiliary bracket, the sliding plates and a set of hydraulic oil cylinders, thus the stretching and turning of the drill bit are achieved using one control mechanism. It is easily understood that in another embodiment, it may merely use the power mechanism for drilling of this embodiment to improve efficiency. While in another embodiment, it merely uses the present embodiment to achieve the control mechanism of the drill bit; at this time, the power mechanism of the drill bit does not need to use an integrated structure of the electric motor and the speed reducer, and may also use a hydraulic motor.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A sidewall coring structure comprising a drill bit, an electric motor and a speed reducer, wherein the electric motor and the speed reducer are an integrated structure and the drill bit is directly connected to an output of the speed reducer, wherein housings of the electric motor and the speed reducer are separable, both of which are sealedly and fixedly connected, and an input gear of the speed reducer is directly mounted on an output shaft of the electric motor, wherein the sidewall coring structure further comprises an auxiliary bracket and at least one pair of parallel sliding plates, the auxiliary bracket being disposed between the at least one pair of parallel sliding plates and connected with the speed reducer via a connecting plate, wherein a first sliding shaft and a rotating shaft hole are provided on the connecting plate, a second sliding shaft and a rotating shaft are symmetrically provided on both sides of the housing of the speed reducer, and wherein a first inclined chute and a second inclined chute are formed on the sliding plate, the first sliding shaft being sleeved within the first inclined chute, the second sliding shaft being sleeved within the second inclined chute, and the rotating shaft being sleeved within the rotating shaft hole of the connecting plate.

2. The sidewall coring structure according to claim 1, wherein an output port of the electric motor has a wire protection device that can rotate with the rotation of the drill bit.

3. The sidewall coring structure according to claim 2, wherein the wire protection device is rotatably and sealedly connected to the electric motor, and a wire of the electric motor is fixed via the wire protection device and rotates with the drill bit.

4. The sidewall coring structure according to claim 2, wherein the wire protection device comprises two parts: a main structure and an auxiliary structure, and a wire groove for fixing the wire of the electric motor is formed within the main structure.

5. A sidewall coring structure comprising a drill bit, a drive device of drill bit and a frame, the drill bit connected to an output of the drive device of drill bit, wherein the sidewall coring structure further comprises a motion control mechanism of drill bit which is accommodated within the frame and the drive device of drill bit is accommodated within the motion control mechanism of drill bit, the motion control mechanism of drill bit is configured to drive the drive device of drill bit to achieve extending-retracting and turning motions, wherein the motion control mechanism of drill bit comprises an auxiliary bracket and at least one pair of parallel sliding plates, the drive device of drill bit is an integrated structure of a speed reducer and an electric motor, both the auxiliary bracket and the drive device of drill bit are disposed between the at least one pair of parallel sliding plates, and the auxiliary bracket and the drive device of drill bit are slidably connected by a connecting plate, and wherein the connecting plate is slidably connected to the sliding plate and is rotatably connected to the drive device of drill bit, a first sliding shaft and a rotating shaft hole are provided on the connecting plate, a second sliding shaft and a rotating shaft are provided on the drive device of drill bit, and wherein a first inclined chute and a second inclined chute are formed on the sliding plate, the first sliding shaft being sleeved within the first inclined chute, the second sliding shaft being sleeved within the second inclined chute, and the rotating shaft being sleeved within the rotating shaft hole.

6. The sidewall coring structure according to claim 5, wherein the motion control mechanism of drill bit further comprises hydraulic oil cylinders, the auxiliary bracket and the drive device of drill bit are movably connected, the sliding plates are configured to horizontally slide along an axial direction of the coring structure under the pushing from the hydraulic oil cylinders and the sliding plates are configured to drive the drive device of drill bit to extend-retract and turn.

7. The sidewall coring structure according to claim 6, wherein the auxiliary bracket limits the horizontal movement of the drive device of drill bit along the axial direction of the coring structure and a clockwise turning motion with respect to the auxiliary bracket.

8. The sidewall coring structure according to claim 6, wherein there are two hydraulic oil cylinders.

9. The sidewall coring structure according to claim 5, wherein a horizontal chute is provided at an end of the first inclined chute, the first inclined chute is in continuous communication with the horizontal chute, an arc chute is within the second inclined chute and the second inclined chute is in continuous communication with the arc chute.

10. The sidewall coring structure according to claim 5, wherein a limit groove is provided at an end of the connecting plate, the second sliding shaft is sleeved within the limit groove, and the limit groove limits a clockwise rotation of the drive device of drill bit driven by the second sliding shaft.

11. The sidewall coring structure according to claim 10, wherein the auxiliary bracket has a turning groove for accommodating the drill bit which is configured to be driven to turn 90 degrees counterclockwise by the drive device of drill bit.

12. The sidewall coring structure according to claim 5, wherein the drill bit is connected to an output of the speed reducer.

13. The sidewall coring structure according to claim 12, wherein housings of the electric motor and the speed reducer are separable, both of which are sealedly and fixedly connected, and an output shaft of the electric motor acts as a fixed shaft of an input gear of the speed reducer.

14. The sidewall coring structure according to claim 12, wherein an output port of the electric motor has a wire protection device that can rotate with the rotation of the drill bit.

15. The sidewall coring structure according to claim 5, wherein the drive device of drill bit comprises a speed reducer and an electric motor which each have a housing, the second sliding shaft and the rotating shaft are formed in the housing of the speed reducer, the rotating shaft is located at a center of the housing of the speed reducer, and the second sliding shaft is eccentrically provided with respect to the rotating shaft.

* * * * *